Sept. 6, 1938.                L. C. FISHER ET AL                2,128,995
                       ELECTRICAL DISTRIBUTION SYSTEM
                    Filed April 17, 1936        2 Sheets-Sheet 1

INVENTORS
Lyman C. Fisher
William H. Frank
BY Daniel G. Cullen
ATTORNEY.

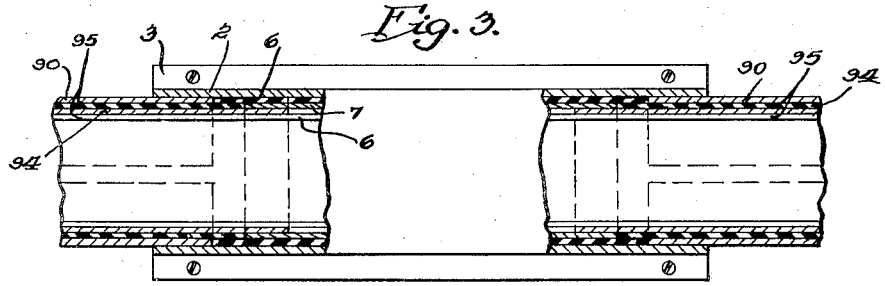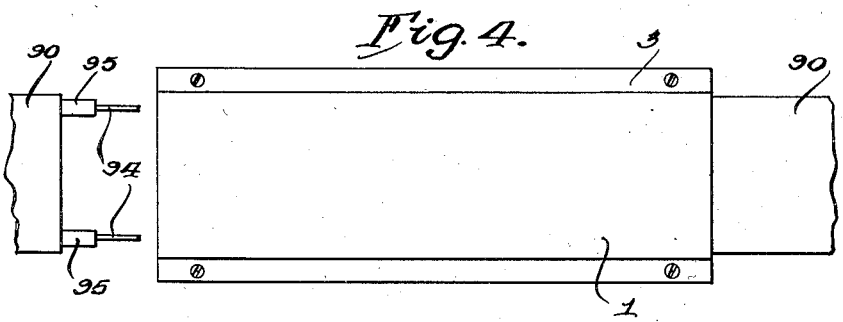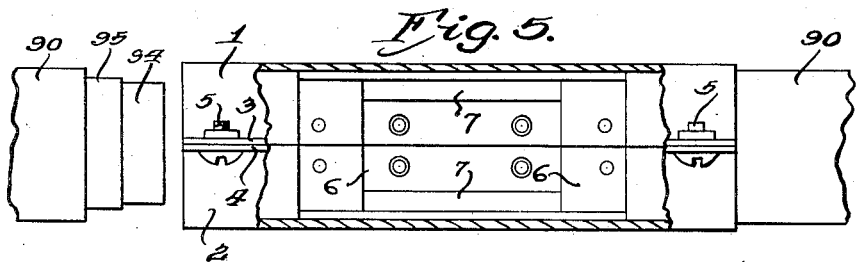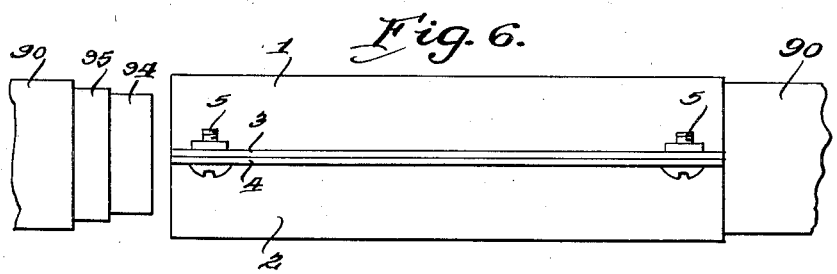

Patented Sept. 6, 1938

2,128,995

UNITED STATES PATENT OFFICE 2,128,995

ELECTRICAL DISTRIBUTION SYSTEM

Lyman C. Fisher and William H. Frank, Detroit, Mich.

Application April 17, 1936, Serial No. 74,903

6 Claims. (Cl. 247—3)

This application relates to the stationary or duct parts of electrical distribution systems of the trolley duct type, such as the one shown in a prior application, Serial No. 38,392, filed August 29, 1935 by Lyman C. Fisher and William H. Frank.

It more particularly relates to a coupler for duct lengths.

For an understanding of the coupler here shown, reference should be had to the appended drawings illustrating the coupler. In these drawings, Fig. 1 shows a split coupler per se;

Fig. 3 is a cutaway plan view showing the coupler in association with two ends of duct lengths;

Fig. 4 is a plan view showing the coupler associated with one duct length end and about to receive another duct length end;

Fig. 5 is a cut away view in elevation of a coupler receiving one duct length end and about to receive another;

Fig. 6 is a view similar to Fig. 5 but with the parts not cut away.

Figure 1:
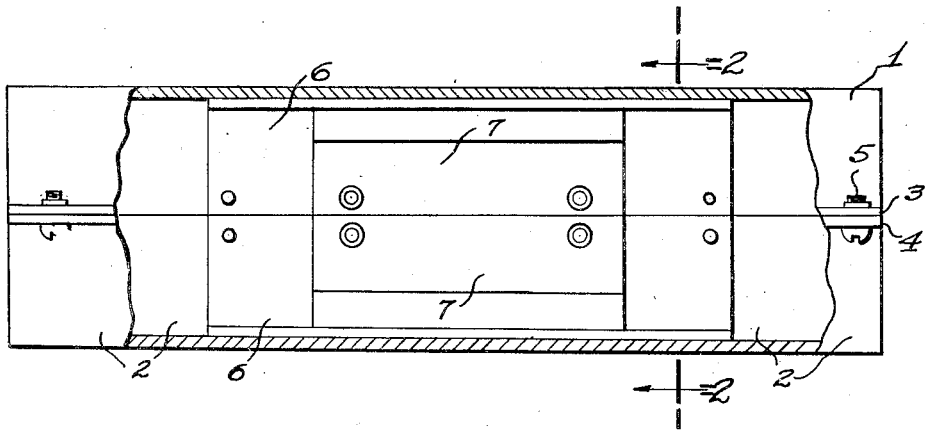
Figure 2:
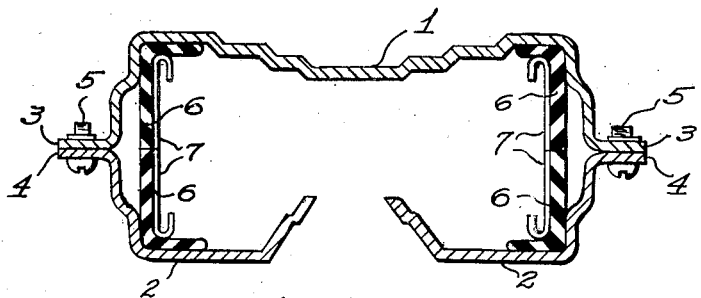
Fig. 2 is a sectional view on line 2—2 of Fig. 1.

It will be understood that the coupler hereof is used to couple ends of duct lengths of the character shown in the above application where the bus bar lengths 94 are longer than the insulation lengths 95, and these in turn are longer than the duct casing lengths 90, as illustrated in Figs. 3–6. For coupling two ends of duct lengths there is provided the coupler hereof, and the latter will now be described.

The coupler comprises a short length of tube formed of a top part 1 and two bottom parts 2, the part 1 having two flanges 3, each of which mates with a flnage 4 on a part 2 for the reception of detachable fasteners such as the screws 5, whereby the bottom parts 2 may be removed from a top part 1 or applied thereto, at will, regardless of whether or not the ends of adjacent duct lengths are within the part 1. In this way, by removing parts 2 from an installed duct run, coupled ends of duct sections may be dropped out of the run, and, also, trolleys within the duct may be dropped out of the run. The parts 2 may be applied to a part 1 after duct section ends are within the part 1, so that coupling of these ends may be made after the duct sections and part 1 are mounted on their supporting surfaces; also when the parts 2 are applied to a part 1, they re-establish the continuity of the tracks of the duct run destroyed by removal of parts 2 from part 1.

On the two sides of the part 1 and on the two sides of the parts 2 are secured insulation parts 6 to which are in turn secured bus coupler conducting sleeves 7. The four sleeves 7 mate in two pairs to form bus coupler sleeves for coupling ends of bus bars 94, and the four insulators 6 mate in two pairs to couple insulation lengths 95 and preserve the continuity of the insulation between the bus bars and the duct casings 90 and the coupler parts 1 and 2.

When a part 2 is detached from or applied to a part 1, the part 7 carried by such part 2 moves with it and enters into coöperation with the mating parts 7 secured to part 1 for the purposes of forming a coupler for the bus bar ends 94 which are within the coupler formed by parts 1 and 2—2.

We claim:

1. For a duct run comprising two lengths of slotted tubular bus duct having bus bars extending beyond the ends of the lengths, a drop-out coupling member for coupling the duct lengths and for providing a means whereby the adjacent ends of the lengths may be removed from the line of the duct run and whereby a trolley within the duct run may be removed from the duct run at the coupling, the coupling member comprising a slotted tube whose cross section is slightly larger than that of the duct lengths whereby it may receive the duct lengths telescoped thereinto, with such lengths having their ends remote from each other, the member being split transversely between its slotted wall and the wall opposite thereto into complementary sections, one of which is removable from the other and comprises two separate side parts, the member having externally accessible means to secure the two separate parts of one of the complementary sections to the other of the complementary sections, the member having therein bus coupling means.

2. For a duct run comprising two lengths of slotted tubular bus duct having bus bars extending beyond the ends of the lengths, a drop-out coupling member for coupling the duct lengths and for providing a means whereby the adjacent ends of the lengths may be removed from the line of the duct run and whereby a trolley within the duct run may be removed from the duct run at the coupling, the coupling member comprising a slotted tube whose cross section is slightly larger than that of the duct lengths whereby it may receive the duct lengths telescoped thereinto, the member being split transversely between its slotted wall and the wall opposite thereto into complementary sections, one of which is removable from the other and comprises two separate side parts, the member having externally accessible means to secure the two separate parts of one of the complementary sections to the other of the complementary sections, the member having therein bus coupling means.

3. For a duct run comprising two lengths of slotted tubular bus duct having bus bars extending beyond the ends of the lengths, a drop out coupling member for coupling the duct lengths and for providing a means whereby the adjacent ends of the lengths may be removed from the line of the duct run and whereby a trolley within the duct run may be removed from the duct run at the coupling, the coupling member comprising a slotted tube whose cross section is slightly larger than that of the duct lengths whereby it may receive the duct lengths telescoped thereinto, the member being split transversely between its slotted wall and the wall opposite thereto into complementary sections, one of which is removable from the other and comprises two separate side parts, the member having externally accessible means to secure the two separate parts of one of the complementary sections to the other of the complementary sections, the member having therein bus coupling means, sectionally arranged so that parts of such means may be assembled around and applied to bus bar ends disposed within parts of the member.

4. For a duct run comprising two lengths of slotted tubular bus duct having bus bars extending beyond the ends of the lengths, a drop out coupling member for coupling the duct lengths and for providing a means whereby the adjacent ends of the lengths may be removed from the line of the duct run and whereby a trolley within the duct run may be removed from the duct run at the coupling, the coupling member comprising a slotted tube whose cross section is slightly larger than that of the duct lengths whereby it may receive the duct lengths telescoped thereinto, the member being split transversely between its slotted wall and the wall opposite thereto into complementary sections, one of which is removable from the other and comprises two separate side parts, the member having externally accessible means to secure the two separate parts of one of the complementary sections to the other of the complementary sections, the member having therein bus coupling means, sectionally arranged so that parts of such means may be assembled around and applied to bus bar ends disposed within parts of the member, with some of the bus coupler parts being carried by the parts of the removable section of the member.

5. For a duct run comprising two lengths of slotted tubular bus duct having bus bars extending beyond the ends of the lengths, a drop out coupling member for coupling the duct lengths and for providing a means whereby the adjacent ends of the lengths may be removed from the line of the duct run and whereby a trolley within the duct run may be removed from the duct run at the coupling, the coupling member comprising a slotted tube whose cross section is slightly larger than that of the duct lengths whereby it may receive the duct lengths telescoped thereinto, with such lengths having their ends remote from each other, the member being split transversely between its slotted wall and the wall opposite thereto into complementary sections, one of which is removable from the other and comprises two separate side parts, the member having externally accessible means to secure the two separate parts of one of the complementary sections to the other of the complementary sections, the member having therein bus coupling means, sectionally arranged so that parts of such means may be assembled around and applied to bus bar ends disposed within parts of the member.

6. For a duct run comprising two lengths of slotted tubular bus duct having bus bars extending beyond the ends of the lengths, a drop out coupling member for coupling the duct lengths and for providing a means whereby the adjacent ends of the lengths may be removed from the line of the duct run and whereby a trolley within the duct run may be removed from the duct run at the coupling, the coupling member comprising a slotted tube whose cross section is slightly larger than that of the duct lengths whereby it may receive the duct lengths telescoped thereinto, with such lengths having their ends remote from each other, the member being split transversely between its slotted wall and the wall opposite thereto into complementary sections, one of which is removable from the other and comprises two separate side parts, the member having externally accessible means to secure the two separate parts of one of the complementary sections to the other of the complementary sections, the member having therein bus coupling means, sectionally arranged so that parts of such means may be assembled around and applied to bus bar ends disposed within parts of the member, with some of the bus coupler parts being carried by the parts of the removable section of the member.

LYMAN C. FISHER.
WILLIAM H. FRANK.